(12) United States Patent
Husemann et al.

(10) Patent No.: US 7,459,499 B2
(45) Date of Patent: Dec. 2, 2008

(54) PRESSURE-SENSITIVE ADHESIVE BASED ON ACRYLATE BLOCK COPOLYMERS

(75) Inventors: Marc Husemann, Hamburg (DE); Thilo Dollase, Hamburg (DE); Bernd Luhmann, Norderstedt (DE)

(73) Assignee: tesa AG, Hamburg (DE)

( * ) Notice: Subject to any disclaimer, the term of this patent is extended or adjusted under 35 U.S.C. 154(b) by 64 days.

(21) Appl. No.: 11/013,237

(22) Filed: Dec. 15, 2004

(65) Prior Publication Data

US 2005/0187346 A1    Aug. 25, 2005

(30) Foreign Application Priority Data

Dec. 18, 2003  (DE) ................. 103 59 973

(51) Int. Cl.
*C08L 53/00* (2006.01)
*B32B 27/28* (2006.01)

(52) U.S. Cl. .................... 525/94; 525/280; 525/284; 525/286; 525/287; 525/291; 525/299; 524/547; 524/548; 524/549; 524/555; 524/560; 524/561; 156/332; 428/522

(58) Field of Classification Search .............. 525/94, 525/294, 299, 280, 284, 286, 287, 291; 156/332; 428/522; 524/547, 548, 549, 555, 560, 561
See application file for complete search history.

(56) References Cited

U.S. PATENT DOCUMENTS

| | | | |
|---|---|---|---|
| 4,581,429 A | 4/1986 | Solomon et al. | 526/220 |
| 5,767,210 A | 6/1998 | Lecomte et al. | 526/166 |
| 5,789,487 A | 8/1998 | Matyjaszewski et al. | 525/301 |
| 5,811,500 A | 9/1998 | Dubois et al. | 526/145 |
| 5,854,364 A | 12/1998 | Senninger et al. | 526/192 |
| 5,919,871 A | 7/1999 | Nicol et al. | 525/333.8 |
| 5,945,491 A | 8/1999 | Matyjaszewski et al. | 526/111 |
| 6,114,482 A | 9/2000 | Senninger et al. | 526/172 |
| 6,479,608 B1 | 11/2002 | Nesvadba et al. | 526/328.5 |
| 2002/0193539 A1 | 12/2002 | Husemann et al. | 526/217 |
| 2003/0096075 A1* | 5/2003 | Dollase et al. | 428/40.1 |
| 2003/0105258 A1 | 6/2003 | Husemann et al. | 526/319 |
| 2003/0114582 A1* | 6/2003 | Husemann et al. | 524/558 |
| 2003/0190467 A1 | 10/2003 | Husemann et al. | 428/354 |
| 2004/0092685 A1 | 5/2004 | Husemann et al. | 526/217 |

FOREIGN PATENT DOCUMENTS

| | | |
|---|---|---|
| DE | 19949352 | 4/2000 |
| DE | 10030217 | 1/2002 |
| DE | 10036801 | 2/2002 |
| DE | 10149084 | 6/2003 |
| EP | 0735052 | 10/1996 |
| EP | 0824110 | 2/1998 |
| EP | 0824111 | 2/1998 |
| EP | 0826698 | 3/1998 |
| EP | 0841346 | 5/1998 |
| EP | 0850957 | 7/1998 |
| JP | 56-0 67 380 | 6/1981 |
| JP | 10-2 51 609 | 9/1998 |
| JP | 10-2 98 248 | 11/1998 |
| JP | 11-3 02 617 | 11/1999 |
| WO | WO 96/24620 | 8/1996 |
| WO | WO 98/01478 | 1/1998 |
| WO | WO 98/13392 | 4/1998 |
| WO | WO 98/44008 | 10/1998 |
| WO | WO 99/31144 | 6/1999 |
| WO | WO 02/10307 | 2/2002 |

* cited by examiner

*Primary Examiner*—Fred M Teskin
(74) *Attorney, Agent, or Firm*—Norris McLaughlin & Marcus, P.A.

(57) ABSTRACT

Pressure-sensitive adhesive comprising an acrylate block copolymer having at least two chemically distinguishable, covalently interlinked acrylate polymer blocks P in microphase-separated regions and each having a softening temperature of between −125 and +20° C.

43 Claims, No Drawings

PRESSURE-SENSITIVE ADHESIVE BASED ON ACRYLATE BLOCK COPOLYMERS

The invention relates to pressure-sensitive adhesives (PSAs) based on acrylate block copolymers and to self-adhesive tapes produced from them.

BACKGROUND OF THE INVENTION

Polyacrylate-based PSAs have already been known for more than 40 years. Within this period they have proven themselves in a multiplicity of different applications, and have become established accordingly. As compared with the PSAs that are likewise widely utilized in self-adhesive tapes that are based on rubbers (e.g. natural rubber or styrene-butadiene rubber) or based on styrene block copolymers (SIS, SBS) they possess numerous advantages. These include their excellent UV and light stability, high resistance to thermooxidative ageing, custom-tailorable polarity and, typically, water-clear transparency. In polyacrylate PSAs, moreover, there is generally an inherent possibility for crosslinking of the polymer chains, a possibility which is generally exploited; as a result these PSAs even at relatively high service temperatures possess good cohesion and hence a high level of temperature stability of the bonds. A further advantage is that polyacrylate PSAs already possess pressure-sensitive tack per se, in other words without additional additives, such as tackifying resins or plasticizers, for example.

New applications, especially industrial applications, are imposing ever more extensive requirements on the performance of polyacrylate PSAs. With the systems available to date, meeting such requirements is in many cases very difficult and in others completely impossible.

Conventional approaches to controlling the properties of polyacrylate PSAs include the choice of identity and quantity of the comonomers employed, the adjustment of molar mass and molar mass distribution in the polymers, and the mode and extent of crosslinking of the polymers. The aforementioned parameters allow the profile of adhesives properties to be controlled with selectivity and precision.

It is found in this context that the comonomers available industrially which can be employed economically for polyacrylate PSAs are limited. Increasing restrictions are coming about, moreover, as a result of progressively tightened statutory regulations. Thus, for example, vinyl acetate and acrylamide have become two relatively objectionable base materials.

In order to meet the increasing requirements made of polyacrylate PSAs the more recent past has seen targeted development of polymerization processes for controlling the molecular weight distribution (DE 100 30 217; DE 100 36 801; DE 101 49 084). Polyacrylates synthesized with such polymerization processes can be utilized with advantage for applications which include pressure-sensitive adhesives that can be coated from the melt. The achievable potential for improvement, however, is limited.

Another path taken to get to improved products involves the possibility of selective synthesis of block copolymers (I. W. Hamley, The Physics of Block Copolymers, 1998, Oxford University Press, Oxford). As a result of chemical coupling of thermodynamically incompatible polymer blocks, such block copolymers exhibit microphase separation: that is, thermodynamically compatible polymer blocks associate while thermodynamically incompatible polymer blocks segregate into spatially separate regions, but without macroscopic phase separation. The result, depending on composition, are phases of different structure. Block copolymers utilized at present in PSAs typically possess two or more polymer blocks of high softening temperature (also referred to below as hard blocks; realized by means of a correspondingly high glass transition temperature or a correspondingly high crystallite melting temperature) and at least one block of low softening temperature (also referred to below as soft block). The composition in systems employed to date has been chosen so that the phase formed by the soft blocks forms a continuous matrix within the PSA, thereby endowing the system with the possibility of PSA properties. The polymer blocks which soften at high temperature associate or segregate to form phase regions (domains) which are typically approximately globular, which are present in dispersion in the continuous matrix of the soft phase and which below their glass transition temperature or crystallite melting temperature act as physical crosslinking points (G. Holden, N. R. Legge, R. P. Quirk, H. E. Schroeder (eds.), Thermoplastic Elastomers, 2nd Ed., 1996, C. Hanser Verlag, Munich). Advantages of PSAs based on such block copolymers include, for example, the possibility of realizing very high shear strengths.

A disadvantage of the aforementioned block copolymers is that in the case of their solvent-free processing the processing temperatures are typically situated well above the softening temperature of the hard block domains (in the case of hard blocks which solidify glassily the required coating temperatures are customarily above—in some cases at least about 30 K to 50 K or even further above—the glass transition temperature (Tg) of the hard block domains) in order for the melt viscosity and/or elasticity to be sufficiently low.

A further disadvantage is the fact that the thermal load-bearing capacity of PSAs based on abovementioned block copolymers, crosslinked physically by way of the hard block domains, is markedly limited as a result of the softening of the hard block domains at high temperatures.

A disadvantage of the known block copolymers comprising hard and soft blocks is the fact, moreover, that the only phase structures obtainable with them that can be used for PSAs are those wherein the hard block phase is dispersed in the form of approximately globular associations in the continuous soft phase of the polymer block of low softening temperature. Phase structures comprising prolate, i.e. uniaxially elongated (e.g. rodlet-shape), oblate, i.e. biaxially elongated (e.g. layer-shaped) or three-dimensionally disposed associations of the hard phase, which are typically formed at relatively high hard block concentrations, are unsuitable for the realization of PSAs, since such systems lack the sufficiently high pliability and/or lack a sufficiently low deformation modulus and so do not meet, for example, the Dahlquist criterion important for pressure-sensitive tack. The wide diversity of phase structures available for block copolymers (see e.g.: H. G. Elias in "Makromoleküle"; Wiley-VCH, 6th Edition 2001, Volume 2, section 8.5.2; I. W. Hamley, The Physics of Block Copolymers, 1998, Oxford University Press, Oxford) hence remains closed for PSAs.

A further disadvantage of known block copolymers is that in order to obtain physical crosslinking and hence in order to realize sufficient cohesion there must be at least two spatially separated polymer blocks of high softening temperature. Diblock copolymers consisting of only one hard block and one soft block are therefore of only limited suitability as a sole polymer component for use in PSAs, especially if high shear strengths are called for.

Block copolymers known correspondingly are thus severely restricted in their structure, and control possibilities for PSAs are limited accordingly.

SUMMARY OF THE INVENTION

The invention is based on the object of providing acrylate block copolymers which are suitable for use in PSAs and which overcome the abovementioned disadvantages of known block copolymers. The acrylate-containing block copolymers ought to exhibit microphase separation by virtue of the presence of thermodynamically compatible polymer blocks and ought in particular to make the overall phase structures that are possible for block copolymers available for PSAs, thereby permitting a significant expansion of the presently accessible performance spectrum of PSAs.

The pressure-sensitive adhesive of the invention comprises an acrylate block copolymer having at least two chemically distinguishable, covalently interlinked acrylate polymer blocks P, the at least two polymer blocks P independently of one another each being a homopolymer block of a first monomer or a copolymer block of a second monomer, which may be the same as or different from the first monomer, with a comonomer. The at least two polymer blocks P are present here under application conditions in microphase-separated regions, are therefore immiscible or not completely miscible, and each have a softening temperature of between −125 and +20° C., in particular in the range between −100° C. and +20° C., preferably between −80° C. and +20° C. By a softening temperature here is meant a glass transition temperature for amorphous systems and a melting temperature in the case of semi-crystalline polymers. The temperatures given here are in accordance with those obtained from quasi-steady-state experiments, such as by means of differential scanning calorimetry (DSC), for example.

Block copolymers of the invention are likewise suitable, by virtue of low melt viscosities, in particular for processing in hotmelt PSAs.

A further significant advantage of block copolymers of the invention is the control over the adhesives properties by way of the possible orientation of anisotropic microphase-separated regions.

DETAILED DESCRIPTION

In one particular embodiment the acrylate block copolymers of the invention are represented by the general stoichiometric formula $$[P1_i\text{-}P2_j]_k \tag{I}$$

in which P1 is a first polymer block of at least one first monomer and P2 is a second polymer block of at least one second monomer, the indices i and j indicating the number of the first and second polymer blocks, respectively, within the structural unit $[P1_i\text{-}P2_j]$ and k indicating the number of the structural unit within the acrylate block copolymer of formula (I), with i, j, k>0. P1 and P2 can here in turn each be homopolymer or copolymer blocks.

Utilized with particular preference in accordance with the invention for use in PSAs are diblock copolymers of formula (I) with i=j=k=1, and hence the block copolymers simplest in construction and most easy to synthesize, with the structure P1-P2, and also triblock copolymers of formula (I) with i+j=3 (i, j>0) and k=1, with the structures P1-P2-P1 or P2-P1-P2. In these copolymers it is possible in each case for the first polymer block P1 to be a polymer P(A) of the monomer A or a copolymer P(A/C) of the monomers A and C and for the second polymer block P2 to be a polymer P(B) of the monomer B or a copolymer P(B/D) of the monomers B and D. A and B here stand for one or more monomers of type A and respectively for one or more monomers of type B (for detailed description see below), which can be utilized for preparing the respective polymer block. Preferred diblock and triblock copolymers are elucidated later on below. Likewise embraced by the invention are linear and star-shaped multiblock copolymers of the general formulae $$[P1\text{-}P2\text{-}P3\text{-}\ldots\text{-}Pm], \tag{II}$$

in which P1 to Pm are m distinguishable polymer blocks with m>3 and, respectively, $$\{P1_\delta\text{-}P2_\delta\text{-}P3_\delta\text{-}\ldots\text{-}Pn_\delta\}_x X, \tag{III}$$

in which P1 to Pn are n distinguishable polymer blocks, with n>1, X is a polyfunctional crosslinking region to which x polymer arms, with x>2, are chemically attached, and the serial number δ indicates the number of a polymer block P within the respective polymer arm, with δ=1 or 2. In both cases the polymer blocks P can independently of one another each be a homopolymer block P(E) of the monomer E or a copolymer block P(E/F) of the monomer E and the comonomer F. Preferred multiblock copolymers are elucidated later on below.

Monomers which can be used for monomer types A, B and E and also for the comonomers C, D and F are likewise elucidated later on below. For the comonomers C, D and F which can be used in the copolymer blocks P(A/C), P(B/D) and P(E/F) it is the case, in a particularly preferred version, that these comonomers have a functional and/or polar group which itself is substantially non-polymerizable but is suitable for entering into non-covalent interactions with further acrylate block copolymer macromolecules, in particular hydrogen bonds and/or dipole-dipole interactions. These interactions have the effect, advantageously, of raising the cohesion of the block copolymer. The comonomers C, D and/or F are preferably represented with a mass fraction of from 0.1 to 50%, in particular from 0.5 to 30%, preferably from 1 to 20%, within the corresponding copolymer blocks.

The invention further provides for the use of the pressure-sensitive adhesive of the invention for adhesive tapes, the pressure-sensitive adhesive being applied to one or both sides of a backing material in tape form. The invention additionally provides an adhesive tape which comprises a backing material in tape form and a pressure-sensitive adhesive in accordance with the invention applied to one or both sides of the backing material over at least part of its area.

In one preferred version of the invention the acrylate block copolymers meet one or more of the following criteria:

a molar mass $M_n$ of below 10 000 000 g/mol, preferably a molar mass of between 30 000 and 1 000 000 g/mol, a polydispersity $D=M_w/M_n$ of less than 5, preferably less than 3, one or more grafted-on side chains.

Particularly preferred in accordance with the invention are block copolymers P(A)-P(B), consisting of two interconnected polymer blocks P(A) and P(B), it being possible for P(A) to be substituted by P(A/C) and/or P(B) to be substituted by P(B/D). P(A) and P(B) identify polymer blocks obtained by polymerizing at least one monomer of type A or by polymerizing at least one monomer of type B, respectively, while P(A/C) and P(B/D) identify copolymer blocks obtained by copolymerizing at least one monomer of type A and at least one monomer of type C or, respectively, by copolymerizing at least one monomer of type B and at least one monomer of type D.

Block copolymers which can be used with particular advantage in PSAs of the invention and comprise two interconnected polymer blocks are those of the general type P(A)-P(B/D), in which each block copolymer is composed of a first polymer block P(A) and a copolymer block P(B/D) attached thereto, where P(A) represents a polymer block obtained by polymerizing at least one monomer of type A, P(A) having a softening temperature of between −125° C. and +20° C., preferably between −100° C. and +20° C., more preferably between −80° C. and +20° C.

P(B/D) represents a copolymer block obtained by copolymerizing at least one monomer of type B and at least one monomer of type D, P(B/D) having a softening temperature of between −125° C. and +20° C., preferably between −100° C. and +20° C., more preferably between −80° C. and +20° C. Monomers of type D possess at least one functional group which behaves substantially inertly in a free-radical copolymerization reaction, in other words does not itself undergo polymerization, and serves in particular for raising the cohesion of the block copolymer.

Polymer blocks P(A) and P(B/D) are in microphase-separated form under application conditions, and so the polymer blocks P(A) and P(B/D) are not completely (homogeneously) miscible under application conditions.

The cohesion-raising effect of the copolymer block P(B/D) can be brought about advantageously by means of intermolecular bonds between the individual block copolymer macromolecules P(A)-P(B/D), the functional group of the comonomer of type D of one block copolymer macromolecule interacting with at least one further block copolymer macromolecule. In a particularly advantageous way the functional group of the comonomers of type D brings about the desired raising of cohesion by means of dipole-dipole interactions and/or hydrogen bonds. A particularly preferred functional group of the comonomers of type D is a carboxylic acid group or a hydroxyl group.

Monomers of type A for the polymer block P(A) are selected such that the resultant polymer blocks P(A) are capable of forming a two-phase microphase-separated structure with the copolymer blocks P(B/D). The mass fraction of the copolymer blocks P(B/D) is preferably between about 20 and 95% by weight, more preferably between 25 and 80% by weight of the entire block copolymer, so that polymer blocks P(B/D) are able to form elongated microphase-separated regions (domains), in the form for example of prolate, i.e. uniaxially elongated (e.g. rodlet-shaped), oblate, i.e. biaxially elongated (e.g. layer-shaped) structural elements, three-dimensionally co-continuous microphase-separated regions or a continuous matrix with regions of the polymer blocks P(A) dispersed therein.

Additionally the weight fraction of the comonomers of type D in the copolymer block P(B/D) in relation to the weight fraction of the monomers of type B is between 0% and 50%, preferably between 0.5% and 30%, more preferably between 1% and 20%.

Block copolymers which can be used additionally with advantage in PSAs of the invention are those of the general type P(A/C)-P(B/D) and also those of the general type P(A)-P(B), where P(A) and P(B) each represent a polymer block obtained by polymerizing at least one monomer of type A or by polymerizing at least one monomer of type B, respectively, P(A) and P(B) having a softening temperature of between −125° C. and +20° C., preferably between −100° C. and +20° C., more preferably between −80° C. and +20° C.

P(A/C) and P(B/D) each represent a copolymer block obtained by copolymerizing at least one monomer of type A or at least one monomer of type B and at least one monomer of type C or at least one monomer of type D, respectively, P(A/C) and P(B/D) having a softening temperature of between −125° C. and +20° C., preferably between −100° C. and +20° C., more preferably between −80° C. and +20° C. Monomers of type C and D possess at least one functional group which behaves substantially inertly in a free-radical copolymerization reaction and serves in particular for raising the cohesion of the block copolymer.

Polymer blocks P(A) and P(B) or polymer blocks P(A/C) and P(B/D) are in microphase-separated form under application conditions, and such polymer blocks are therefore not completely (homogeneously) miscible under application conditions.

The fraction of the polymer blocks P(B) and P(B/D) is preferably between about 20 and 95% by weight, more preferably between 25 and 80% by weight of the entire block copolymer, so that polymer blocks P(B) and/or P(B/D) are able to form elongated microphase-separated regions, in the form for example of prolate (e.g. rodlet-shaped) or oblate (e.g. area-shaped) structural elements, three-dimensional co-continuous microphase-separated regions or a continuous matrix with regions of the polymer blocks P(A) and/or P(A/C) dispersed therein.

Additionally the weight fraction of the comonomers of type D in the copolymer block P(B/D) in relation to the weight fraction of the comonomers of type B in the copolymer block P(B/D) is between 0.1 and 50%, preferably between 0.5 and 30%, more preferably between 1 and 20%. The same applies to the weight fraction of the comonomers of type C in the copolymer block P(A/C) in relation to the weight fraction of the comonomers of type A in the copolymer block P(A/C).

Block copolymers which can be used with advantage in PSAs of the invention further include those of general structure Z-P1-P2-Z', in particular Z-P(A)-P(B)-Z', Z-P(A/C)-P(B)-Z', Z-P(A/C)-P(B/D)Z', where Z and Z' can comprise further polymer blocks or else functional groups and where Z and Z' may be identical or different.

Of particularly preferred utility in accordance with the invention are block copolymers comprising a unit of three interconnected polymer blocks of type P(A)-P(B)-P(A'), it being possible for P(A) to be substituted by P(A/C) and/or for P(B) to be substituted by P(B/D) and/or for P(A') to be substituted by P(A'/C').P(A), P(B) and P(A') identify polymer blocks obtained by polymerizing at least one monomer of type A, B or A', respectively. P(A/C), P(B/D) and P(A'/C') identify copolymer blocks obtained by copolymerizing at least one monomer of type A and at least one monomer of type C or at least one monomer of type B and one monomer of type D, at least one monomer of type A' and one monomer of type C', respectively.

Structurally possible in accordance with the invention are not only symmetrical but also asymmetrical constructions of aforementioned block copolymers, in respect both of geometric parameters (e.g. block lengths and block length distribution, and block molar mass distribution) but also of the chemical structure of the polymer blocks. In the descriptions which follow it is assumed that both kinds of polymers, both symmetric and asymmetric, can be used in accordance with the invention. In order to keep the description readable the possibility of molecular asymmetry is not mentioned explicitly in every case.

Block copolymers which can be used with particular advantage in PSAs of the invention, comprising three interconnected polymer blocks, are those based on the general type P(A)-P(B/D)-P(A), in which each block copolymer is composed of a central copolymer block P(B/D) and two polymer blocks P(A) attached to it, where P(B/D) represents a copolymer obtained by copolymerizing at least one monomer of type B and at least one monomer of type D, P(B/D) having a softening temperature of between −125° C. and +20° C., preferably between −100° C. and +20° C., more preferably between −80° C. and +20° C., the comonomer of type D possessing at least one functional group which behaves substantially inertly in a free-radical polymerization reaction, and which serves in particular for raising the cohesion of the block copolymer.

P(A) represents a polymer block obtained by polymerizing at least one monomer of type A, P(A) having a softening temperature of between −125° C. and +20° C., preferably between −100° C. and +20° C., more preferably between −80° C. and +20° C.

Polymer blocks P(A) and P(B/D) are in microphase-separated form under application conditions, and so the polymer blocks P(A) and the polymer blocks P(B/D) are not completely (homogeneously) miscible under application conditions.

By softening temperature is meant a glass transition temperature for amorphous systems and a melting temperature in the case of semi-crystalline polymers. The temperatures indicate here correspond to those obtained from quasi-steady-state experiments, such as by means of DSC, for example.

The cohesion-raising effect of the copolymer block P(B/D) can be brought about advantageously by means of bonds between the individual block copolymer macromolecules P(A)-P(B/D)-P(A), the functional groups of the comonomer of type D of one block copolymer macromolecule interacting with at least one further block copolymer macromolecule. In a particularly advantageous way the functional group of the comonomers of type D brings about the desired raising of cohesion by means of dipole-dipole interactions and/or hydrogen bonds. A particularly preferred functional group of the monomers of type D is a carboxylic acid group or a hydroxyl group. It is further the case for the polymer block P(B/D) that the weight fraction of the monomers of type D in relation to the weight fraction of the monomers of type B is between 0.1 and 50%, preferably between 0.5 and 30%, more preferably between 1 and 20%.

Monomers of type A for the polymer blocks P(A) are selected such that the resultant polymer blocks P(A) are capable of forming a two-phase microphase-separated structure with the copolymer blocks P(B/D). The fraction of the polymer blocks P(A) is preferably between 5 and 95% by weight, more preferably between 10 and 90% by weight of the overall block copolymer.

Block copolymers which can be used with particular advantage in PSAs of the invention are additionally those of the general type P(B/D)-P(A)-P(B/D), each block copolymer being composed of a central polymer block P(A) and two polymer blocks P(B/D) attached to it on either side, characterized in that P(B/D) represents a copolymer obtained by copolymerizing at least one monomer of type B and at least one monomer of type D, P(B/D) having a softening temperature of between −125° C. and +20° C., preferably between −100° C. and +20° C., more preferably between −80° C. and +20° C., the monomers D possessing at least one functional group which behaves substantially inertly in a free-radical polymerization reaction, and which serves in particular for raising the cohesion of the block copolymer.

P(A) characterizes a polymer obtained by polymerizing at least one monomer of type A, P(A) having a softening temperature of between −125° C. and +20° C., preferably between −100° C. and +20° C., more preferably between −80° C. and +20° C.

Polymer blocks P(A) and polymer blocks P(B/D) are in microphase-separated form, and so blocks P(B/D) and P(A) are not completely miscible under application conditions.

The monomers of type D preferably include at least one functional group which behaves very substantially inertly in a free-radical polymerization reaction and which serves in particular for raising the cohesion of the block copolymer, in particular by means of bonds between the individual block copolymer macromolecules, the functional group of component D of one block copolymer macromolecule interacting with at least one further block copolymer macromolecule. Preferably the mass fraction of the polymer blocks P(A) is between 5 and 95% by weight, in particular between 10 and 90% by weight of the overall block copolymer. Additionally the weight fraction of the comonomers of type D in the copolymer block P(B/D) in relation to the weight fraction of the comonomers of type B in the copolymer block P(B/D) is between 0.1 and 50%, preferably between 0.5 and 30%, more preferably between 1 and 20%.

Block copolymers which can be used with particular advantage in PSAs of the invention are additionally those of the general type P(B/D)-P(A/C)-P(B/D), each block copolymer being composed of a central polymer block P(A/C) and two polymer blocks P(B/D) attached to it on either side, characterized in that P(B/D) and P(A/C) each represent a copolymer block obtained by copolymerizing at least one monomer of type A or B and at least one monomer of type C or D, P(B/D) and P(A/C) having a softening temperature of between −125° C. and +20° C., preferably between −100° C. and +20° C., more preferably between −80° C. and +20° C., the monomers C and D possessing at least one functional group which behaves substantially inertly in a free-radical polymerization reaction, and which serves in particular for raising the cohesion of the block copolymer.

Polymer blocks P(A/C) and polymer blocks P(B/D) are in microphase-separated form, and so blocks P(B/D) and P(A/C) are not completely (homogeneously) miscible under application conditions.

The monomers of type C and D preferably include at least one functional group which behaves very substantially inertly in a free-radical polymerization reaction and which serves in particular for raising the cohesion of the block copolymer, in particular by means of bonds between the individual block copolymer macromolecules, the functional group of components C and D of one block copolymer macromolecule interacting with at least one further block copolymer macromolecule. Preferably the fraction of the polymer blocks P(A/C) is between 5 and 95% by weight, in particular between 10 and 90% by weight of the overall block copolymer. Additionally the weight fraction of the comonomers of type D in the copolymer block P(B/D) in relation to the weight fraction of the comonomers of type B in the copolymer block P(B/D) is between 0.1 and 50%, preferably between 0.5 and 30%, more preferably between 1 and 20%. The same applies to the ratio of the weight fractions of the comonomers C and A in the copolymer block P(A/C).

Further advantageous and part of this invention are compounds of the general structure Z-P(A)-P(B)-P(A')-Z', it being possible for Z and Z' to comprise further polymer blocks or else functional groups and for Z and Z' to be identical or different. P(A), P(B) and P(A') can also be in the form, optionally and independently of one another, of copolymer blocks P(A/C), P(B/D) and P(A'/C'), respectively. In specific cases it is possible for individual blocks to be omitted.

With particular advantage in accordance with the invention it is likewise possible to utilize linear and star-shaped multiblock copolymers whose structure is preferably as follows:

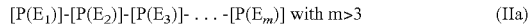  (IIa)

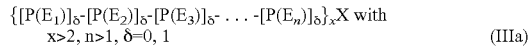  (IIIa)

where
(IIa) identifies a linear multiblock copolymer composed of m polymer blocks P(E).
(IIIa) is a star-shaped multiblock copolymer comprising a polyfunctional crosslinking region X, in which x polymer arms are joined to one another chemically and each polymer arm is composed of at least one polymer block P(E). Serial number δ indicates that the x polymer arms joined to one another by chemical bonding in the polyfunctional crosslinking region can each have a different number of polymer blocks P(E).
P(E) can be substituted in each case by P(E/F), and P(E) represent polymer blocks obtained by polymerizing at least one monomer of type E, and P(E/F) represent copolymer blocks obtained by copolymerizing at least one monomer of type E and at least one monomer of type F.
The individual P(E) have a softening temperature of between −125 and +20° C., preferably between −100 and +20° C., more preferably between −80 and +20° C. Monomers of type C possess at least one functional group which behaves substantially inertly in a free-radical copolymerization reaction and which serves in particular for raising the cohesion of the block copolymer.
Polymers are in microphase-separated form under application conditions, and so the individual polymer blocks are not completely (homogeneously) miscible under application conditions.

Typical methods of determining the existence of microphase separation include for example
transmission electron microscopy (TEM) in the case of materials which interact differently with staining agents;
atomic force microscopy (AFM) by way of the surface topology, a contrast in hardness or in adhesion;
scattering methods (neutron scattering, small-angle X-ray scattering) in the case of materials with phases which show a difference in the material/radiation effect cross-section;
calorimetric methods, such as differential thermocalorimetry (DSC) or differential thermal analysis (DTA) and also Theological measurements for materials with phases of different softening points;
NMR spin diffusion for materials with phases differing in dynamics.

The microphase separation observed in PSAs of the invention only in the limiting case yields the ideal structures such as are frequently described, for example, in the classic phase diagrams of block copolymers (see e.g.: H. G. Elias in "Makromoleküle"; Wiley-VCH, 6th Edition 2001, Volume 2, section 8.5.2 or I. W. Hamley, The Physics of Block Copolymers, 1998, Oxford University Press, Oxford). This is also not at all desirable in every case, since controlling the quality of microphase separation makes it possible advantageously to influence the adhesives properties of the PSAs.

The monomers A for the polymer blocks P(A) and/or the copolymer blocks P(A/C) and monomers B for the polymer blocks P(B) and/or the copolymer blocks P(B/D) or monomers E for the polymer blocks P(E) and/or the copolymer blocks P(E/F) of the PSAs used in accordance with the invention are preferably chosen such that the blocks interlinked in the block copolymer are not completely (homogeneously) miscible with one another and, consequently, form a two-phase structure. This structure includes domains composed of miscible block segments (including whole blocks in the ideal case) of different (and possibly also identical) chains. Prerequisites for miscibility are a chemically similar construction of these block segments or blocks and block lengths adapted to one another. The domains adopt a particular shape and superstructure depending on the volume fraction of a phase within the system as a whole. Depending on the choice of monomers used it is possible for the domains to differ in their softening/glass transition temperatures, their hardness and/or their polarity.

The monomers employed in the polymer blocks P(A), P(B) and P(E) and in the copolymer blocks P(A/C), P(B/D) and P(E/F) are taken from the same monomer pool described below.

For the PSAs of the invention described here it is advantageous to use acrylic monomers or vinyl monomers, more preferably those monomers which lower the softening/glass transition temperature of the copolymer block P(A/C)—also in combination with monomer C—or of the copolymer block P(B/D)—also in combination with monomer D—or of the copolymer block P(E/F)—also in combination with monomer F—to below 20° C.

When selecting the monomers for the PSA of the invention great advantage attaches to using one or more compounds which can be described by the following general formula.

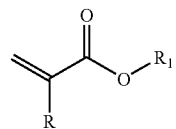  (IV)

In this formula R=H or $CH_3$ and the radical $R_1$ is selected from the group consisting of branched and unbranched, saturated alkyl groups having 1 to 20 carbon atoms.

Acrylic monomers which are used with preference for the inventive PSA as monomers A, B, or E include acrylic and methacrylic esters with alkyl groups consisting of 1 to 18 carbon atoms, preferably 4 to 9 carbon atoms. Specific examples, without wishing to be restricted by this enumeration, are methyl acrylate, ethyl acrylate, n-butyl acrylate, n-pentyl acrylate, n-hexyl acrylate, n-heptyl acrylate, n-octyl acrylate, n-nonyl acrylate, lauryl acrylate, stearyl acrylate and their branched isomers, such as 2-ethylhexyl acrylate, isobutyl acrylate and isooctyl acrylate, for example.

Further monomers to be used for the polymer blocks P(A), P(B) and P(E) and copolymer blocks P(A/C), P(B/D) and P(E/F) are monofunctional acrylates and methacrylates of bridged cycloalkyl alcohols composed of at least 6 carbon atoms. The cycloalkyl alcohols may also be substituted. Specific examples are cyclohexyl methacrylate, isobornyl acrylate, isobornyl methacrylate and 3,5-dimethyladamantyl acrylate.

Additionally use is made optionally, for the polymer blocks P(A), P(B) and P(E) and copolymer blocks P(A/C), P(B/D) and P(E/F), of vinyl monomers from the following groups: vinyl esters, vinyl ethers, vinyl halides, vinylidene halides, vinyl compounds containing aromatic rings and heterocycles in α position. Here again mention may be made non-exclusively of some examples, particularly vinyl acetate, vinylformamide, ethyl vinyl ether, vinyl chloride, vinylidene chloride and acrylonitrile.

The monomers B of the acrylate block copolymers of the invention embrace the group of the monomers A. In one preferred version the monomer B for the polymer block P(B) is different from the polymer A for the polymer block P(A). For the case of interpretation whereby two or more monomers are used for the polymer blocks P(A) or P(B), the monomers B are different from the monomers B or differ in their composition from the monomers A. In another preferred version the monomers B that are used differ from the monomers A in their number.

When synthesizing the block copolymers of the invention it is necessary to ensure when selecting the monomer combinations that the polymer blocks prepared from the monomers used are not completely miscible with one another.

In a further preferred procedure the monomers used as comonomers C, D and F for the copolymer blocks P(A/C), P(B/D) and P(E/F) are vinyl compounds, acrylates and/or methacrylates which carry functional and/or polar groups such as, for example, carboxyl radicals, sulphonic and phosphonic acid groups, hydroxy radicals, lactam and lactone, N-substituted amide, N-substituted amine, carbamate, epoxy, thiol, alkoxy or cyano radicals, ethers, halides or the like.

Very advantageously for the PSA of the invention the monomers used as monomers C, D and F for the copolymer blocks P(A/C), P(B/D) and/or P(E/F) comprise one or more monomers having at least one functional group which can be described by the following general formula.

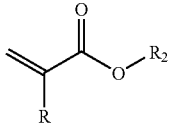

(V)

In this formula R=H or $CH_3$ and the radical $R_2$=H or an organic radical containing at least one functional group and containing between 1 and 30 carbon atoms.

Particularly preferred examples of corresponding monomers containing vinyl groups suitably include, for example, acrylic acid, hydroxyethyl acrylate, hydroxypropyl acrylate, hydroxyethyl methacrylate, hydroxypropyl methacrylate, N-methylolacrylamide, methacrylic acid, allyl alcohol, maleic anhydride, itaconic anhydride, itaconic acid, phenoxyethyl acrylate, phenoxyethyl methacrylate, 2-butoxyethyl methacrylate, 2-butoxy-ethyl acrylate, cyanoethyl methacrylate, cyanoethyl acrylate, 6-hydroxyhexyl methacrylate, tetrahydrofurfuryl acrylate, acrylamide and glycidyl methacrylate.

Moderate basic monomers C, D and F for the copolymer blocks P(A/C), P(B/D) and P(E/F) are, for example, N,N-dialkyl-substituted amides, such as N,N-dimethylacrylamide, N,N-dimethylmethacrylamide, N-vinylpyrrolidone, N-vinyllactam, dimethylaminoethyl acrylate, dimethylaminoethyl methacrylate, diethylaminoethyl methacrylate, diethyl-aminoethyl acrylate, N-methylolacrylamide, N-methylolmethacrylamide, N-(butoxymethyl)-methacrylamide, N-(ethoxymethyl)acrylamide, and N-isopropylacrylamide, this enumeration being intended to be regarded as by way of example.

As monomers C, D and F for the copolymer blocks P(A/C), P(B/D) and P(E/F) it is additionally possible to use vinylphosphonic acid, vinylsulphonic acid and the sodium salt of vinylsulphonic acid.

As monomers C, D and F for the copolymer blocks P(A/C), P(B/D) and P(E/F) it is also possible, furthermore, to use zwitterionic monomers, such as the group of the betaines, for example. Examples of suitable betaines include ammonium carboxylates, ammonium phosphates and ammonium sulphonates. Specific examples include N-(3-sulphopropyl)-N-acryloyloxyethyl-N,N-dimethylammonium betaine, 1-(3-sulphopropyl)-2-vinylpyridinium betaine and N-(3-sulphopropyl)-N-allyl-N,N-dimethylammonium betaine. Particularly preferred examples are N-(3-sulphopropyl)-N-methacryloyloxyethyl-N,N-dimethyl-ammonium betaine and N-(3-sulphopropyl)-N-acryloyloxyethyl-N,N-dimethylammonium betaine. N-(3-sulphopropyl)-N-methacryloxyethyl-N,N-dimethylammonium betaine is available commercially from Raschig AG, Germany. This enumeration likewise possesses no claim to completeness.

Likewise suitable as monomers for comonomers C, D and F for the copolymer blocks P(A/C), P(B/D) and P(E/F) are (meth)acrylic monomers or vinyl monomers which increase the softening/glass transition temperature of the copolymer block P(A/C)—also in combination with monomer A—and/or of the copolymer block P(B/D)—also in combination with monomer B—and/or of the copolymer block P(E/F)—also in combination with monomer E.

Examples of corresponding monomers for C, D and F are hence also methyl meth-acrylate, cyclohexyl methacrylate, t-butyl acrylate, isobornyl methacrylate, benzyl acrylate, benzoin acrylate, acrylated benzophenone, benzyl methacrylate, benzoin methacrylate, methacrylated benzophenone, phenyl acrylate, phenyl methacrylate, t-butylphenyl acrylate, t-butylphenyl methacrylate, 4-biphenylyl acrylate, 2-naphthyl acrylate and 2-naphthyl methacrylate, and styrene, this enumeration not being conclusive.

Vinylaromatic monomers C, D and F for the copolymer blocks P(A/C), P(B/D) and P(E/F), which may also be alkylated, functionalized or contain heteroatoms and which preferably possess aromatic nuclei of $C_4$ to $C_{18}$, also include α-methylstyrene, 4-vinylbenzoic acid, the sodium salt of 4-vinylbenzenesulphonic acid, 4-vinylbenzyl alcohol, 2-vinyl-naphthalene, 4-vinylphenylboronic acid, 4-vinylpyridine, phenyl vinylsulphonate, 3,4-dimethoxystyrene, vinyl benzotrifluoride, p-methoxystyrene, 4-vinylanisole, 9-vinylanthracene, 1-vinylimidazole, 4-ethoxystyrene, and N-vinylphthalimide, this enumeration making no claim to completeness.

The polymerization can be carried out by any method known per se or in modification of a method known per se, in particular by means of conventional free-radical addition polymerization and/or by means of controlled free-radical addition polymerization; the latter is characterized by the presence of suitable control reagents.

To prepare the block copolymers it is possible in principle to use all polymerizations which proceed in accordance with a controlled or living mechanism, including combinations of different controlled polymerization methods. Without possessing any claim to completeness, mention may be made here, by way of example, besides anionic polymerization, of ATRP, nitroxide/TEMPO-controlled polymerization or, more preferably, the RAFT process; in other words, particularly those methods which allow control over the block lengths, polymer architecture or else, but not necessarily, the tacticity of the polymer chain.

Radical polymerizations can be conducted in the presence of an organic solvent or in the presence of water or in mixtures of organic solvents and/or organic solvent with water, or without solvent. When carrying out the polymerization in organic solvents it is preferred to use as little solvent as possible. Depending on conversion and temperature, the polymerization time for radical processes is typically between 4 and 72 h.

In the case of solution polymerization the solvents used are preferably esters of saturated carboxylic acids (such as ethyl acetate), aliphatic hydrocarbons (such as n-hexane, n-heptane or cyclohexane), ketones (such as acetone or methyl ethyl ketone), special boiling point spirit, aromatic solvents such as toluene or xylene, or mixtures of aforementioned solvents. For polymerization in aqueous media or in mixtures of organic and aqueous solvents it is preferred to add emulsifiers and/or stabilizers for the polymerization.

Where a method of radical polymerization is employed it is advantageous to make use, as polymerization initiators, of customary radical-forming compounds, such as peroxides, azo compounds and peroxosulphates, for example. Initiator mixtures also possess outstanding suitability.

In an advantageous procedure radical stabilization is effected using nitroxides of type (VIa) or (VIb):

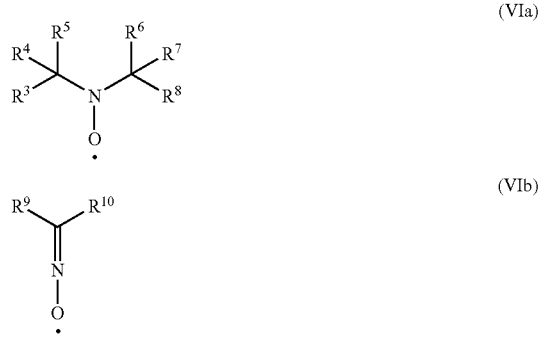

where $R^3, R^4, R^5, R^6, R^7, R^8, R^9$ and $R^{10}$ independently of one another denote the following compounds or atoms:
i) halogens, such as chlorine, bromine or iodine
ii) linear, branched, cyclic and heterocyclic hydrocarbons having 1 to 20 carbon atoms, which can be saturated, unsaturated or aromatic,
iii) esters —$COOR^{11}$, alkoxides —$OR^{12}$ and/or phosphonates —$PO(OR^{13})_2$, where $R^{11}$, $R^{12}$ or $R^{13}$ stand for radicals from group ii).

Compounds of structure (VIa) or (VIb) may also be attached to polymer chains of any kind (primarily in the sense that at least one of the abovementioned radicals constitutes such a polymer chain) and can therefore be used as macroradicals or macroregulators to construct the block copolymers.

More strongly preferred as controlled regulators for the polymerization are compounds of the following types:
2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxyimine-PROXYL, 3-aminomethyl-PROXYL, 3-methoxy-PROXYL, 3-t-butyl-PROXYL, 3,4-di-t-butyl-PROXYL 2,2,6,6-tetramethyl-1-piperidinyloxyl (TEMPO), 4-benzoyloxy-TEMPO, 4-methoxy-TEMPO, 4-chloro-TEMPO, 4-hydroxy-TEMPO, 4-oxo-TEMPO, 4-amino-TEMPO, 2,2,6,6-tetraethyl-1-piperidinyloxyl, 2,2,6-trimethyl-6-ethyl-1-piperidinyloxyl N-tert-butyl 1-phenyl-2-methylpropyl nitroxide
N-tert-butyl 1-(2-naphthyl)-2-methylpropyl nitroxide
N-tert-butyl 1-diethylphosphono-2,2-dimethylpropyl nitroxide
N-tert-butyl 1-dibenzylphosphono-2,2-dimethylpropyl nitroxide
N-(1-phenyl-2-methylpropyl) 1-diethylphosphono-1-methylethyl nitroxide
di-t-butyl nitroxide
diphenyl nitroxide
t-butyl t-amyl nitroxide U.S. Pat. No. 4,581,429 A discloses a controlled-growth radical polymerization method initiated using a compound of formula R'R"N—O—Y in which Y is a free-radical species which is able to polymerize unsaturated monomers. The reactions, however, generally have low conversions. A particular problem is the polymerization of acrylates, which proceeds only to very low yields and molar masses. WO 98/13392 A1 describes open-chain alkoxyamine compounds which have a symmetrical substitution pattern. EP 735 052 A1 discloses a method of preparing thermoplastic elastomers having narrow molar mass distributions. WO 96/24620 A1 describes a polymerization method using very specific radical compounds, such as phosphorus-containing nitroxides based on imidazolidine, for example. WO 98/44008 A1 discloses specific nitroxyls based on morpholines, piperazinones and piperazinediones. DE 199 49 352 A1 describes heterocyclic alkoxyamines as regulators in controlled-growth radical polymerizations. Corresponding further developments of the alkoxyamines and of the corresponding free nitroxides improve the efficiency for preparing polyacrylates (Hawker, contribution to the National Meeting of the American Chemical Society, Spring 1997; Husemann, contribution to the IUPAC World-Polymer Meeting 1998, Gold Coast).

As a further controlled polymerization technique it is possible advantageously to use atom transfer radical polymerization (ATRP) to synthesize the block copolymers, with preferably monofunctional or difunctional secondary or tertiary halides being used as initiator and, to abstract the halide(s), complexes of Cu, Ni, Fe, Pd, Pt, Ru, Os, Rh, Co, Ir, Ag or Au (EP 0 824 111 A1; EP 826 698 A1; EP 824 110 A1; EP 841 346 A1; EP 850 957 A1). The different possibilities of ATRP are also described in the publications U.S. Pat. No. 5,945,491 A, U.S. Pat. No. 5,854,364 A and U.S. Pat. No. 5,789,487 A.

In a further controlled polymerization method 1,1-diphenylethylene is used as a control reagent. The preparation of block copolymers by this route has likewise been described (Macromol. Chem. Phys., 2001, 22, 700).

It is additionally possible with advantage to prepare the block copolymer utilized in accordance with the invention by means of an anionic polymerization. In this case the reaction medium used preferably comprises inert solvents, such as aliphatic and cycloaliphatic hydrocarbons, for example, or else aromatic hydrocarbons.

The living polymer is generally represented by the structure $P_L(A)$-Me, in which Me is a metal from group I, such as lithium, sodium or potassium, and $P_L(A)$ is a growing polymer block of the monomers A. The molar mass of the polymer block under preparation is determined by the ratio of initiator concentration to monomer concentration. In order to construct the block structure, first of all the monomers A are added for the construction of a polymer block P(A), then, by adding the monomers B, a polymer block P(B) is attached, and subsequently, by again adding monomers A, a further polymer block P(A) is polymerized on, so as to form a triblock copolymer P(A)-P(B)-P(A). Alternatively P(A)-P(B)-M can be coupled by means of a suitable difunctional compound. By this route star-shaped multiblock copolymers of formula (IV) as well are obtainable.

Examples of suitable polymerization initiators include n-propyllithium, n-butyllithium, sec-butyllithium, 2-naphthyllithium, cyclohexyllithium or octyllithium, this enumeration making no claim to completeness. Also known, and suitable for use here, are initiators based on rare earth element complexes for the polymerization of acrylates (Macromolecules, 1995, 28, 7886).

It is also possible, moreover, to use difunctional initiators, such as 1,1,4,4-tetraphenyl-1,4-dilithiobutane or 1,1,4,4-tetraphenyl-1,4-dilithioisobutane, for example. Coinitiators may likewise be used. Suitable coinitiators include lithium halides, alkali metal alkoxides or alkylaluminium compounds. In one very preferred version the ligands and coinitiators are chosen so that acrylate monomers, such as n-butyl acrylate and 2-ethylhexyl acrylate, can be polymerized directly and do not have to be generated in the polymer by transesterification with the corresponding alcohol.

After the anionic polymerization it is advisable to carry out a polymer-analogous reaction in order to liberate polar groups. One possibility for preparing acrylate block copolymers functionalized with carboxylic acid groups involves the anionic polymerization of tert-butyl acrylate followed if desired by hydrolysis of the tert-butyl group with trifluoroacetic acid, thereby liberating the carboxylic acid group.

A very preferred preparation process conducted is a variant of the RAFT polymerization (reversible addition-fragmentation chain transfer polymerization). The polymerization process is described in detail, for example, in the publications WO 98/01478 A1 and WO 99/31144 A1. Suitable with particular advantage for the preparation of triblock copolymers are trithiocarbonates of the general structure R'''—S—C(=S)—S—R''' (Macro-molecules 2000, 33, 243-245), by means of which, in a first step, monomers for the end blocks P(A) are polymerized. Then, in a second step, the central block P(B) is synthesized. Following the polymerization of the end blocks P(A) the reaction can be terminated and reinitiated. It is also possible to carry out polymerization sequentially without interrupting the reaction. In one very advantageous variant, for example, the trithiocarbonates (VII) and (VIII) or the thio compounds (IX) and (X) are used for the polymerization, it being possible for φ to be a phenyl ring, which can be unfunctionalized or functionalized by alkyl or aryl substituents attached directly or via ester or ether bridges, or to be a cyano group, or to be a saturated or unsaturated aliphatic radical. The phenyl ring φ may optionally carry one or more polymer blocks, corresponding to the definition of P(A), P(B), P(A/C) and P(B/D). Functionalizations may, for example, be halogens, hydroxyl groups, epoxide groups, groups containing nitrogen or sulphur, with this list making no claim to completeness.

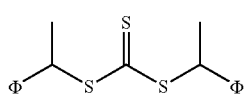

(VII)

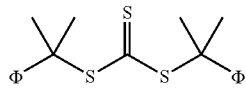

(VIII)

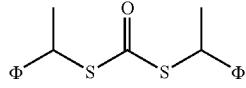

(IX)

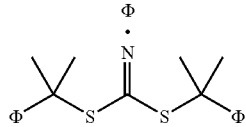

(X)

It is additionally possible to employ thioesters of the general structure $R^{IV}$—C(=S)—S—$R^V$, particularly in order to prepare asymmetric systems. $R^{IV}$ and $R^V$ can be selected independently of one another and $R^{IV}$ can be a radical from one of the following groups i) to iv) and $R^V$ a radical from one of the following groups i) to iii):

i) $C_1$ to $C_{18}$ alkyl, $C_2$ to $C_{18}$ alkenyl, $C_2$ to $C_{18}$ alkynyl, each linear or branched; aryl-, phenyl-, benzyl-, aliphatic and aromatic heterocycles.

ii) —$NH_2$, —NH—$R^{VI}$, —$NR^{VI}R^{VII}$, —NH—C(=O)—$R^{VI}$, —$NR^{VI}$—C(=O)—$R^{VII}$, —NH—C(=S)—$R^{VI}$, —$NR^{VI}$—C(=S)—$R^{VII}$,

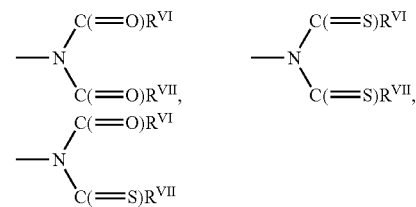

with $R^{VI}$ and $R^{VII}$ being radicals selected independently of one another from group i).

iii) —S—$R^{VIII}$, —S—C(=S)—$R^{VIII}$, with $R^{VIII}$ being able to be a radical from one of groups i) and ii).

iv) —O—$R^{VIII}$, —O—C(=O)—$R^{VIII}$, with $R^{VIII}$ being able to be a radical from one of groups i) and ii).

In connection with the abovementioned polymerizations which proceed by controlled radical mechanisms it is preferred to use initiator systems which further comprise additional radical initiators for the polymerization, especially thermally decomposing radical-forming azo or peroxo initiators. In principle, however, all customary initiators known for acrylates are suitable for this purpose. The production of C-centred radicals is described in Houben-Weyl, Methoden der Organischen Chemie, Vol. E19a, p. 60ff. These methods are preferentially employed. Examples of radical sources are peroxides, hydroperoxides and azo compounds. A few non-exclusive examples of typical radical initiators that may be mentioned here include the following: potassium peroxodisulphate, dibenzoyl peroxide, cumene hydroperoxide, cyclohexanone peroxide, cyclohexyl-sulphonyl acetyl peroxide, di-tert-butyl peroxide, azodiisobutyronitrile, diisopropyl percarbonate, tert-butyl peroctoate, and benzpinacol. In one very preferred variant the radical initiator used is 1,1'-azobis(cyclohexylnitrile) (Vazo 88®, DuPont®) or 2,2-azobis(2-methylbutanenitrile) (Vazo 67®, DuPont®). It is also possible, furthermore, to use radical sources which release radicals only under UV irradiation.

In the case of the conventional RAFT process polymerization is generally carried out only to low conversions (WO 98/01478 A1), in order to obtain very narrow molecular weight distributions. Because of the low conversions, however, these polymers cannot be used as pressure-sensitive adhesives and in particular not as hotmelt adhesives, since the high residual monomer fraction adversely affects the adhesives properties, the residual monomers contaminate the solvent recyclate in the concentration process, and the corresponding self-adhesive tapes would exhibit very high outgassing. In accordance with the invention, therefore, the solvent is preferably stripped off in a concentrative extruder under reduced pressure, for which purpose it is possible to use, for example, single-screw or twin-screw extruders, which preferably distil off the solvent in different or the same vacuum stages and which preferably possess a feed preheater.

For advantageous further development, tackifing resins can be admixed to the block copolymer PSAs. In principle it is possible to use all resins soluble in the corresponding polyacrylate blocks P(A) and P(AC) or P(B) and P(B/D) or P(E) and P(E/F), respectively. Suitable tackifying resins include rosin and rosin derivatives (rosin esters, including rosin derivatives stabilized by means, for example, of disproportionation or hydrogenation), polyterpene resins, terpenephenolic resins, alkylphenol resins, aliphatic, aromatic and aliphatic-aromatic hydrocarbon resins, to name but a few. The weight fraction of the resins as a proportion of the PSA is up to 60% by weight, more preferably up to 50% by weight. For one specific way of carrying out the invention it is also possible to use resins which specifically are compatible with only one, or one part, of the polymer blocks P(A) and P(A/C) and/or P(B) and P(B/D) and/or P(E) and P(E/F), respectively.

It is additionally possible, optionally, to use plasticizers, fillers (e.g. fibers (e.g. cellulose fibres or polyvinyl alcohol fibres), carbon black, zinc oxide, titanium dioxide, chalk, solid or hollow glass beads, microspheres of other materials, silica, silicates), nucleators, expandants, compounding agents and/or ageing inhibitors, in the form for example of primary and secondary antioxidants or in the form of light stabilizers.

In one particularly preferred version the inventive PSAs are crosslinked. The PSAs are preferably crosslinked chemically. For this purpose it is possible optionally to add compatible crosslinker substances to the acrylate block copolymer PSAs. Examples of suitable crosslinkers include metal chelates, polyfunctional isocyanates, polyfunctional amines, polyfunctional epoxides or polyfunctional alcohols. Polyfunctional acrylates too can be used with advantage as crosslinkers for actinic irradiation.

For the optional crosslinking with UV light, UV-absorbing photoinitiators are added to the acrylate block copolymers. Useful photoinitiators which can be used to great effect are benzoin ethers, such as benzoin methyl ether and benzoin isopropyl ether, substituted acetophenones, such as 2,2-diethoxyacetophenone (available as Irgacure 651® from Ciba Geigy®), 2,2-dimethoxy-2-phenyl-1-phenylethanone and dimethoxyhydroxyacetophenone, substituted α-ketols, such as 2-methoxy-2-hydroxypropiophenone, aromatic sulphonyl chlorides, such as 2-naphthylsulphonyl chloride, and photoactive oximes, such as 1-phenyl-1,2-propanedione 2-(O-ethoxycarbonyl) oxime, for example.

The abovementioned photoinitiators and others which can be used, including those of the Norrish I or Norrish II type, can contain the following radicals: benzophenone, acetophenone, benzil, benzoin, hydroxyalkylphenone, phenyl cyclohexyl ketone, anthraquinone, trimethylbenzoylphosphine oxide, methylthiophenyl morpholinyl ketone, amino ketone, azo benzoin, thioxanthone, hexaarylbisimidazole, triazine, or fluorenone, it being possible for each of these radicals to be further substituted by one or more halogen atoms and/or one or more alkyloxy groups and/or one or more amino groups or hydroxyl groups. A representative overview is given by Fouassier: "Photoinititation, Photopolymerization and Photocuring: Fundamentals and Applications", Hanser-Verlag, Munich 1995. For further details it is possible to consult Carroy et al. in "Chemistry and Technology of UV and EB Formulation for Coatings, Inks and Paints", Oldring (Ed.), 1994, SITA, London.

Moreover, it is also possible to crosslink the inventive acrylate block copolymers using electron beams. Typical irradiation devices which may be employed are linear cathode systems, scanner systems and segmented cathode systems, in the case of electron beam accelerators. A detailed description of the state of the art and the most important process parameters can be found in Skelhorne, Electron Beam Processing, in Chemistry and Technology of UV and EB formulation for Coatings, Inks and Paints, Vol. 1, 1991, SITA, London. The typical acceleration voltages are in the range between 50 kV and 500 kV, preferably between 80 kV and 300 kV. The scatter doses employed range between 5 to 150 kGy, in particular between 20 and 100 kGy.

The invention further provides for the use of the resulting PSA for a self-adhesive tape, where the acrylate PSA is present as a single-sided or double-sided film on a backing or else may serve as a PSA per se in adhesive transfer tapes.

The inventive PSAs can be used with particular preference for adhesive bonds at very low temperatures. By means of deliberate overcrosslinking it is possible via the end blocks to prepare domains featuring high crosslinking, which give the PSA the necessary strength and at the same time exhibit excellent flow behaviour at low temperatures.

The invention is elucidated in more detail below in exemplary embodiments.

Test Methods

180° Bond Strength Test (Test A)

The bond strength was determined in a method based on PSTC-101. A strip 20 mm wide of a PSA coated onto siliconized release paper was transferred by lamination to a PET film, 25 µm thick and provided with a Saran primer, and then this PSA tape specimen was applied to a steel plate. The steel plates had been washed beforehand twice with acetone and once with isopropanol. The PSA strip was pressed down twice onto the substrate using a 2 kg weight. The adhesive tape was then immediately removed from the substrate at 30 mm/min and at an angle of 180°. The results of the measurements are reported in N/cm and represent the mean of three individual measurements. All measurements were conducted at room temperature under standardized climatic conditions.

Gel Permeation Chromatography (GPC) (Test B)

The average molecular weights $M_n$ (number average) and $M_w$ (weight average) and the polydispersity D were determined by gel permeation chromatography. The eluent used was THF containing 0.1% by volume trifluoroacetic acid. Measurement took place at 25° C. The precolumn used was PSS-SDV, 5µ, $10^3$ Å, ID 8.0 mm×50 mm. Separation was carried out using the columns PSS-SDV, 5µ, $10^3$ and also $10^5$ and $10^6$ each of ID 8.0 mm×300 mm. The sample concentration was 4 g/l, the flow rate 1.0 ml per minute. Measurement was made against PMMA standards.

Shear Stability Times (Test C)

Testing took place in a method based on PSTC-107. A 50 µm layer of pressure-sensitive adhesive is applied to a 25 µm PET film. A strip of this sample 1.3 cm thick was adhered to a polished steel plate over a length of 2 cm, by rolling over it back and forth three times using a 2 kg roller. The plates were equilibrated for 30 minutes under test conditions (temperature and humidity) but without loading. Then the test weight was hung on, exerting a shearing stress parallel to the bond surface, and the time taken for the bond to fail was measured. If a holding time of 10 000 minutes was reached, the test was discontinued before failure of the adhesive bond.

Differential Thermocalorimetry (DSC) (Test D)

The measurements were made using a dynamic power-compensation differential calorimeter from Mettler Toledo. Measurements took place within a temperature range from −150° C. to 180° C. The heating rates were 10° C./min. Two heating curves were measured in each case, the second heating curve being used to determine the glass transition temperature. The onset glass transition temperature was the temperature determined.

Production of Test Specimens

Preparation of a RAFT Regulator:

The bis-2,2'-phenylethyl trithiocarbonate regulator (formula VIII) was prepared starting from 2-phenylethyl bromide using carbon disulphide and sodium hydroxide in accordance with a set of instructions in Synth. Comm., 1988, 18 (13), 1531. Yield: 72%. $^1$H-NMR (CDCl$_3$), δ: 7.20-7.40 ppm (m, 10H); 3.81 ppm (m, 1H); 3.71 ppm (m, 1H); 1.59 ppm (d, 3H); 1.53 ppm (d, 3H).

EXAMPLE 1

A 2l reactor conventional for radical polymerization is charged under a nitrogen atmosphere with 30 g of acrylic acid, 50 g of 2-ethylhexyl acrylate, 1.2 g of bis-2,2'-phenylethyl trithiocarbonate regulator and 80 g of acetone. This initial charge is heated to an internal temperature of 60° C. and initiated with 0.2 g of Vazo 67® (DuPont) in solution in 5 g of acetone. After a reaction time of 1.5 hours initiation is repeated with 0.2 g of Vazo 67® (DuPont) in solution in 5 g of acetone. After a reaction time of 5 hours and 7 hours dilution is carried out, with 50 g of acetone each time. After a reaction time of 24 hours a sample is taken.

Gel permeation chromatography (test B) against PMMA standards gave $M_n$=32 200 g/mol and $M_w$=36 700 g/mol. The quasistatic glass transition temperature measured by DSC (test D) for this polymer block was −4° C.

Polymerization is continued in the same reactor after a reaction time of 24 h. Added to the polymer are 320 g of 2-ethylhexyl acrylate, 80 g of acetone and 20 g of isopropanol. After a reaction time of 24.75 hours initiation is repeated with 0.2 g of Vazo 67® (DuPont) in solution in 5 g of acetone. After 28.5 hours and 32 hours dilution is carried out with acetone, 50 g in each case. After 48 hours initiation is repeated with 0.2 g of Vazo 67® (DuPont) in solution in 5 g of acetone. After 55.5 hours 20 g of acetone are added and after 72 hours the reaction is terminated by cooling to room temperature.

Gel permeation chromatography (test B) against PMMA standards gave $M_n$=48 600 g/mol and $M_w$=83 500 g/mol. The quasistatic glass transition temperature for the poly(2-EHA) block measured by DSC (test D) for this polymer block was −65° C.

For adhesives testing the polymer was blended with 2% by weight of titanium(IV) bis(acetylacetonato)diisopropoxide, coated out from solution onto a primed PET film 25 µm thick and then dried at 120° C. for 10 minutes. After drying, the application rate was 100 g/m$^2$. Adhesives testing was carried out via test methods A and C.

EXAMPLE 2

A 2l reactor conventional for radical polymerization is charged under a nitrogen atmosphere with 16 g of acrylic acid, 64 g of 2-ethylhexyl acrylate, 1.2 g of bis-2,2'-phenylethyl trithiocarbonate regulator and 120 g of acetone. This initial charge is heated to an internal temperature of 60° C. and initiated with 0.1 g of Vazo 67® (DuPont) in solution in 5 g of acetone. After 1 hour and 15 minutes a further 0.1 g of Vazo 67® (DuPont) in solution in 5 g of acetone is added. After 2 hours and 55 minutes 0.15 g of Vazo 67® (DuPont) in solution in 5 g of acetone is added and after a reaction time of 4 hours and 25 minutes a further 0.1 g of Vazo 67® (DuPont) in solution in 5 g of acetone. After 24 h a sample is taken.

Gel permeation chromatography (test B) against PMMA standards gave $M_n$=20 200 g/mol and $M_w$=25 600 g/mol. The quasistatic glass transition temperature measured by DSC (test D) for this polymer block was −33° C.

Polymerization is continued in the same reactor after a reaction time of 24 h. Added to the polymer are 320 g of 2-ethylhexyl acrylate and 0.2 g of Vazo 67® (DuPont) in solution in 5 g of acetone. After a total reaction time of 30 hours dilution is carried out with 150 g of acetone. After a reaction time of 48 h, initiation is repeated using 0.2 g of Vazo 67® (DuPont) in solution in 5 g of acetone. The polymerization is terminated after 72 h by cooling to room temperature.

Gel permeation chromatography (test B) against PMMA standards gave $M_n$=66 400 g/mol and $M_w$=109 000 g/mol. The quasistatic glass transition temperature for the poly(2-EHA) block measured by DSC (test D) for this polymer block was −65° C.

For adhesives testing the polymer was blended with 2% by weight of titanium(IV) bis(acetylacetonato)diisopropoxide, coated out from solution onto a primed PET film 25 µm thick and then dried at 120° C. for 10 minutes. After drying, the application rate was 100 g/m$^2$. Adhesives testing was carried out via test methods A and C.

Results

The DSC measurements demonstrate that the inventive acrylate block copolymers are obtainable via the synthesis route selected. To test the adhesives properties, PSA tape specimens were produced from the examples and were subjected to adhesives testing. The results are summarized in Table 1.

TABLE 1

| Example | SST RT/(test C) | BS-steel [N/cm]/(test A) |
| --- | --- | --- |
| 1 | 24 | 2.0 |
| 2 | 3930 | 2.0 |

Application rate: 100 g/m$^2$
SST: Shear stability times [min]
RT: Room temperature
BS: Bond strength to steel

We claim:

1. Pressure-sensitive adhesive comprising an acrylate blockcopolymer having at least two chemically distinguishable, covalently interlinked acrylate polymer blocks P, the at least two polymer blocks P independently of one another each being a homopolymer block of a first monomer or a copolymer block of a second monomer, which may be the same as or different from the first monomer, with a comonomer, and the at least two polymer blocks P being present under application conditions in microphase-separated regions and each having a softening temperature of between −125 and +19° C.

2. Pressure-sensitive adhesive according to claim 1, wherein the microphase-separated regions of the at least two distinguishable polymer blocks P each have softening temperatures of between −100 and +19° C.

3. Pressure-sensitive adhesive according to claim 1, wherein the acrylate block copolymer comprises a structure of general formula (I)

$$[P1_i\text{-}P2_j]_k, \qquad (I)$$

in which P1 is a first polymer block of at least one first monomer and P2 is a second polymer block of at least one second monomer, the indices i and j indicating the number of the first and second polymer blocks, respectively, within the structural unit $[P1_i\text{-}P2_j]$ and k indicating the number of the structural unit within the acrylate block copolymer of formula (I), with i, j, k>0.

4. Pressure-sensitive adhesive according to claim 3, wherein the acrylate block copolymer comprises terminally, on one side or on both sides, a group Z, which is a functional group or a further polymer block, distinguishable from the at least two polymer blocks P, the group(s) Z provided on both sides being identical or different.

5. Pressure-sensitive adhesive according to claim 3, wherein the first polymer block P1 is a polymer block P(A) of the monomer A or a copolymer block P(A/C) of the monomers A and C and the second polymer block P2 is a polymer block P(B) of the monomer B or a copolymer block P(B/D) of the monomers B and D.

6. Pressure-sensitive adhesive according to claim 5, wherein the comonomer C of the copolymer block P(A/C) and/or the comonomer D of the copolymer block P(B/D) comprise(s) at least one functional group that forms dipole-dipole interactions and/or hydrogen bonds with another block copolymer macromolecule.

7. Pressure-sensitive adhesive according to claim 5, wherein the comonomers C and D independently of one another within the copolymer block P(A/C) and P(B/D) respectively have a mass fraction of between 0.1 and 50%.

8. Pressure-sensitive adhesive according to claim 3, wherein the acrylate block copolymer is a diblock copolymer with i=j=k=1, comprising one polymer block P1 and one polymer block P2 in accordance with P1-P2.

9. Pressure-sensitive adhesive according to claim 8, wherein the mass fraction of the second polymer block P2 in the diblock copolymer in the range from 20 to 95%.

10. Pressure-sensitive adhesive according to claim 8, wherein the acrylate block copolymer is a diblock copolymer in accordance with P(A)-P(B) or P(A)-P(B/D), the polymer blocks P(A) and P(B) being a polymer of the monomer A or B respectively and the copolymer block P(B/D) being a copolymer block of the monomers B and D.

11. Pressure-sensitive adhesive according to claim 3, wherein the acrylate block copolymer is a triblock copolymer with i+j=3 and k=1, comprising three polymer blocks in accordance with P1-P2-P1 or P2-P1-P2.

12. Pressure-sensitive adhesive according to claim 11, wherein the mass fraction of the polymer blocks P1 and P2 in the triblock copolymer is in each case between 5 and 95%.

13. Pressure-sensitive adhesive according to claim 11, wherein the acrylate block copolymer is a triblock copolymer in accordance with P(A)-P(B/D)-P(A) or P(B/D)-P(A)-P(B/D) or P(B/D)-P(A/C)-P(B/D).

14. Pressure-sensitive adhesive according to either of claims 1 or 2, wherein the acrylate block copolymer comprises a linear multiblock copolymer in accordance with general formula (II)

$$[P1\text{-}P2\text{-}P3\text{-}\ldots\text{-}Pm], \qquad (II)$$

in which P1 to Pm are m distinguishable polymer blocks, with m>3.

15. Pressure-sensitive adhesive according to either of claims 1 or 2, wherein the acrylate block copolymer comprises a star-shaped multiblock copolymer in accordance with general formula (III)

$$\{P1_\delta\text{-}P2_\delta\text{-}P3_\delta\text{-}\ldots\text{-}Pn_\delta\}_x X, \qquad (III)$$

in which P1 to Pn are n distinguishable polymer blocks, with n>1, X is a polyfunctional crosslinking region to which x polymer arms, with x>2, are chemically attached, and the serial number δ indicates the number of a polymer block P within the respective polymer arm, with δ=1 or 2.

16. Pressure-sensitive adhesive according to claim 14, wherein the polymer blocks P independently of one another are each a homopolymer block P(E) of the monomer E or a copolymer block P(E/F) of the monomers E and F.

17. Pressure-sensitive adhesive according to claim 16, wherein the comonomer F comprise(s) at least one functional group that forms dipole-dipole interactions and/or hydrogen bonds with other multiblock copolymer macromolecules.

18. Pressure-sensitive adhesive according to claim 5, wherein the monomers A and B are selected independently of one another from the group consisting of acrylic, methacrylic and vinyl monomers.

19. Pressure-sensitive adhesive according to claim 18, wherein monomers A and/or B are of the formula (IV)

in which R is hydrogen or a methyl group and $R_1$ is a branched or unbranched, saturated $C_1$ to $C_{20}$ alkyl group.

20. Pressure-sensitive adhesive according to claim 19, wherein $R_1$ is a $C_1$ to $C_{18}$ alkyl group.

21. Pressure-sensitive adhesive according to claim 19, wherein $R_1$ is a bridged or unbridged, substituted or unsubstituted cycloalkyl group.

22. Pressure-sensitive adhesive according to claim 18, wherein the monomers A, and/or B are vinyl monomers selected from the group consisting of vinyl esters, vinyl ethers, vinyl halides, vinylidene halides and vinyl compounds having aromatic rings and heterocycles in α position.

23. Pressure-sensitive adhesive according to claim 22, wherein the monomers A and/or B are selected from the group consisting of vinyl acetate, vinyl formamide, ethyl vinyl ether, vinyl chloride, vinylidene chloride and acrylonitrile.

24. Pressure-sensitive adhesive according to claim 13, wherein the comonomers C and D of the copolymer blocks P(A/C) and P(B/D) are selected independently of one another from the group consisting of acrylic and methacrylic monomers and vinyl monomers.

25. Pressure-sensitive adhesive according to claim 24, wherein the comonomers C and/or D carry at least one functional and/or polar group selected from the group consisting of carboxyl, sulphonic acid, phosphonic acid, hydroxyl, lactam, lactone, N-substituted amide, N-substituted amine, carbamate, epoxy, thiol, alkoxy, cyano, ether and halide groups.

26. Pressure-sensitive adhesive according to claim 24 or 25, wherein the comonomers C and/or D are of formula (V)

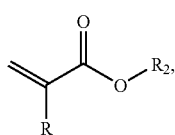

(V)

in which R is hydrogen (H) or a methyl group and $R_2$ is hydrogen (H) or a $C_1$ to $C_{30}$ hydrocarbon radical containing at least one functional and/or polar group.

27. Pressure-sensitive adhesive according to claim 24 or 25, wherein the comonomers C and/or D are selected from the group consisting of acrylic acid, methacrylic acid, hydroxyethyl acrylate, hydroxyethyl methacrylate, hydroxypropyl acrylate, hydroxypropyl methacrylate, N-methylolacrylamide, allyl alcohol, maleic anhydride, itaconic anhydride, itaconic acid, phenoxyethyl acrylate, phenoxyethyl methacrylate, 2-butoxyethyl acrylate, 2-butoxyethyl methacrylate, cyanoethyl acrylate, cyanoethyl methacrylate, 6-hydroxyhexyl methacrylate, tetrahydrofurfuryl acrylate, acrylamide and glycidyl methacrylate.

28. Pressure-sensitive adhesive according to claim 24 or 25, wherein the comonomers C and/or D carry moderately basic functional groups selected from the group consisting of N,N-dimethylacrylamide, N,N-dimethylmethacrylamide, N-vinylpyrrolidone, N-vinyllactam, dimethylaminoethyl acrylate, dimethylaminoethyl methacrylate, diethylaminoethyl methacrylate, diethylaminoethyl acrylate, N-methylolacrylamide, N-methylolmethacrylamide, N-(butoxymethyl)methacrylamide, N-(ethoxymethyl)acrylamide and N-isopropyl-acrylamide.

29. Pressure-sensitive adhesive according to claim 24 or 25, wherein the comonomers C and/or D are vinylphosphonic acid or vinylsulphonic acid.

30. Pressure-sensitive adhesive according to claim 24 or 25, wherein the comonomers C and/or D are zwitterionic monomers, selected from the group consisting of N-(3-sulphopropyl)-N-acryloyloxyethyl-N,N-dimethylammonium betaine, 1-(3-sulphopropyl)-2-vinylpyridinium betaine, N-(3-sulphopropyl)-N-allyl-N,N-dimethylammonium betaine, N-(3-sulphopropyl)-N-methacryloyloxyethyl-N,N-dimethylammonium betaine and N-(3-sulphopropyl)-N-acryloyloxyethyl-N,N-dimethylammonium betaine.

31. Pressure-sensitive adhesive according to claim 24 or 25, wherein the comonomers C, and/or D are selected from the group consisting of methyl methacrylate, cyclohexyl methacrylate, t-butyl acrylate, isobornyl methacrylate, benzyl acrylate, benzoin acrylate, acrylated benzophenone, benzyl methacrylate, benzoin methacrylate, methacrylated benzophenone, phenyl acrylate, phenyl methacrylate, t-butylphenyl acrylate, t-butylphenyl methacrylate, 4-biphenylyl acrylate, 2-naphthyl acrylate and 2-naphthyl methacrylate and styrene.

32. Pressure-sensitive adhesive according to claim 24 or 25, wherein the comonomers C, and/or d are selected from the group consisting of α-methylstyrene, 4-vinylbenzoic acid, the sodium salt of 4-vinylbenzenesulphonic acid, 4-vinylbenzyl alcohol, 2-vinylnaphthalene, 4-vinylphenylboronic acid, 4-vinylpyridine, phenyl vinylsulphonate, 3,4-dimethoxystyrene, vinyl benzotrifluoride, p-methoxystyrene, 4-vinylanisole, 9-vinylanthracene, 1-vinylimidazole, 4-ethoxystyrene and N-vinylphthalimide.

33. Pressure-sensitive adhesive according to claim 1, wherein the acrylate block copolymer has a molar mass of not more than 10 000 000 g/mol.

34. Pressure-sensitive adhesive according to claim 1, wherein the acrylate block copolymer has a polydispersity of not more than 5.

35. Pressure-sensitive adhesive according to claim 1, wherein the acrylate block copolymer has one or more grafted-on side chains.

36. Pressure-sensitive adhesive according to claim 1, comprising further components selected from the group consisting of tackifier resins, plasticizers, fillers, nucleators, expandants, compounding agents, ageing inhibitors and combinations thereof.

37. A method for preparing an adhesive tape, which comprises applying the pressure-sensitive adhesive according to claim 1 or 2 to one or both sides of a backing material in tape form.

38. Adhesive tape comprising a backing material in tape form and a pressure-sensitive adhesive according to claim 1 or 2 applied to one or both sides of the backing material over at least part of its area.

39. Pressure-sensitive adhesive according to claim 15, wherein the polymer blocks P independently of one another are each a homopolymer block P(E) of the monomer E or a copolymer block P(E/F) of the monomers E and F.

40. Pressure-sensitive adhesive according to claim 20, wherein $R_1$ is selected from the group consisting of methyl, ethyl, n-butyl, n-pentyl, n-hexyl, n-heptyl, n-octyl, n-nonyl, lauryl, stearyl and its branched isomers, isobutyl and isooctyl.

41. Pressure-sensitive adhesive according to claim 21, wherein $R_1$ is selected from the group consisting of cyclohexyl metharylate, isobornyl acrylate, isobornyl methacrylate and 3,5-dimethyladamantyl acrylate.

42. Pressure-sensitive adhesive according to claim 39, wherein the comonomer F comprise(s) at least one functional group that forms dipole-dipole interactions and/or hydrogen bonds with other multiblock copolymer macromolecules.

43. Pressure-sensitive adhesive according to claim 16, wherein the monomers E are selected from the group consisting of acrylic, methacrylic and vinyl monomers.

* * * * *

UNITED STATES PATENT AND TRADEMARK OFFICE
CERTIFICATE OF CORRECTION

PATENT NO. : 7,459,499 B2
APPLICATION NO. : 11/013237
DATED : December 2, 2008
INVENTOR(S) : Husemann et al.

It is certified that error appears in the above-identified patent and that said Letters Patent is hereby corrected as shown below:

Column 3, line 60, "i + j- 3" should read --i + j =3--

Column 14, line 19, "R'R"N O Y" should read --R'R"N–O–Y--

Signed and Sealed this

Thirteenth Day of July, 2010

David J. Kappos
*Director of the United States Patent and Trademark Office*